(12) United States Patent
Kitamori et al.

(10) Patent No.: US 9,478,972 B2
(45) Date of Patent: Oct. 25, 2016

(54) OVER-VOLTAGE PREVENTION DEVICE

(71) Applicant: KABUSHIKI KAISHA TOSHIBA, Tokyo (JP)

(72) Inventors: Yutaro Kitamori, Tokyo (JP); Takahisa Kageyama, Chiba (JP); Teruyuki Ishizuki, Tokyo (JP); Takashi Fujita, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 14/615,897

(22) Filed: Feb. 6, 2015

(65) Prior Publication Data
US 2015/0229120 A1 Aug. 13, 2015

(30) Foreign Application Priority Data
Feb. 7, 2014 (JP) ................................ 2014-022376

(51) Int. Cl.
| | |
|---|---|
| F03D 9/00 | (2016.01) |
| H02P 1/26 | (2006.01) |
| H02H 7/09 | (2006.01) |
| H02H 7/06 | (2006.01) |
| H02H 7/10 | (2006.01) |
| H02H 9/04 | (2006.01) |
| H02J 3/38 | (2006.01) |

(52) U.S. Cl.
CPC ............... *H02H 7/09* (2013.01); *H02H 7/065* (2013.01); *H02H 7/10* (2013.01); *H02H 9/041* (2013.01); *H02P 29/0241* (2016.02); *H02J 3/386* (2013.01)

(58) Field of Classification Search
USPC .......................................... 290/44; 318/732
See application file for complete search history.

(56) References Cited

U.S. PATENT DOCUMENTS

| | | | |
|---|---|---|---|
| 2006/0192390 A1* | 8/2006 | Juanarena Saragueta | ............... F03D 9/002 290/44 |
| 2008/0304188 A1 | 12/2008 | Ichinose et al. | |
| 2011/0057446 A1* | 3/2011 | Mayor Lusarreta | ............... F03D 9/002 290/44 |

FOREIGN PATENT DOCUMENTS

| | | |
|---|---|---|
| EP | 1499009 A1 | 1/2005 |
| JP | 06-054444 | 2/1994 |
| JP | 6054444 A * | 2/1994 |
| JP | H07 67393 A | 3/1995 |
| WO | WO 2010/045964 A1 | 4/2010 |

OTHER PUBLICATIONS

Extended European Search Report and Opinion Under Rule 62(1) EPC, mailed on Jun. 12, 2015, from the European Patent Office in counterpart European Patent Application No. 15 153 940.0 (6 pages).

* cited by examiner

*Primary Examiner* — Eduardo Colon Santana
*Assistant Examiner* — Cortez Cook
(74) *Attorney, Agent, or Firm* — Finnegan, Henderson, Farabow, Garrett & Dunner, LLP

(57) ABSTRACT

According to one embodiment, an over-voltage prevention device is provided between a secondary-winding side of a wound-rotor induction machine and a frequency converter configured to excite the secondary-winding side of the wound-rotor induction machine through a three-phase excitation power supply line. The over-voltage prevention device includes a first short-circuit device having a function of short-circuiting between phases of the excitation power supply line, and a second short-circuit device having a function of short-circuiting between phases of the excitation power supply line with a short-circuit impedance greater than a short-circuit impedance of the first short-circuit device.

2 Claims, 4 Drawing Sheets

OVER-VOLTAGE PREVENTION DEVICE

CROSS-REFERENCE TO RELATED APPLICATIONS

This application is based upon and claims the benefit of priority from Japanese Patent Application No. 2014-022376, filed Feb. 7, 2014, the entire contents of which are incorporated herein by reference.

FIELD

Embodiments described herein relate generally to an over-voltage prevention device which protects a frequency converter or a secondary winding of a wound-rotor induction machine from an over-voltage.

BACKGROUND

Generally, in variable speed motor systems adopting an inductor as a power generation motor, an accidental over-voltage or over-current may be induced to a secondary-winding side of a power generator due to a problem on the electric power system, and a power converter which supplies an excitation current having a variable frequency may be damaged as a result of the induced over-current. Over-current and over-voltage prevention methods applying a short-circuit device are generally used to prevent the above problems.

The over-current and over-voltage prevention methods applying a short-circuit device of the variable speed motor systems generally utilize an over-voltage prevention device comprising a short-circuit device connected to a three-phase electric device to be protected from an over-voltage in which thyristor valves, each having thyristors connected in series, are connected by a delta connection, a flip-flop to be set by an over-voltage being applied to the three-phase electric device, an AND circuit to provide a trigger signal to the thyristor valves under an AND condition of a forward voltage signal of the thyristor valves and an output of the flip-flop, a current detector which detects a current of each thyristor valve, and a means for resetting the flip-flop under a condition where an output of the current detector is zero for a predetermined period.

In the aforementioned over-current and over-voltage prevention methods of the variable speed motor systems, when a problem occurs on the electric power system, a transitional over-voltage or over-current occurs for either grounding or inter-short-circuiting in the variable speed motor systems. In this case, an over-voltage or over-current flows into the system in comparison with the normal operation, and an over-voltage or over-current is induced to a secondary-winding side of a wound-rotor induction machine. If the secondary-winding side of the induction machine does not have a short circuit device, an over-voltage or over-current directly flows into the power converter. To avoid this, it is necessary to provide a large-capacity converter in the case of a fault in the electric power system, which rarely occurs.

One of the solutions to this problem is to adopt a power generator system in which a secondary-winding side of a power generator is short-circuited by a first short-circuit device 7 having a small impedance, as shown in FIG. The first short-circuit device 7 has a circuit structure as shown in FIG. 6. With the first short-circuit device 7, in a band where a slip frequency of a motor is large, over-current flowing into the over-voltage prevention device significantly increases, and accordingly, a power converter 10, the capacity of which is determined based on a voltage, and a current in normal operation cannot open the over-voltage prevention device, and the secondary-winding side of the power generator cannot recover from the short-circuited status, thereby failing to ensure continuous operation.

Another solution is to adopt a power generator system in which a secondary-winding side of a power generator is resistance short-circuited by a second short-circuit device 8 having a minute impedance greater than the impedance of the first short-circuit device 7, as shown in FIG. 5. The second short-circuit device 8 has a circuit structure as shown in FIG. 7. If the resistance of the second short-circuit device 8 is sufficiently small, resistance R2 from windings of a rotor of the power generator to the short-circuit device 8 becomes sufficiently smaller than resistance R1 from a point of failure caused by a fault in the electric power system to windings of a stator of the power generator. Accordingly, a transitional DC current flowing into the second short-circuit device 8 of the secondary-winding side of the power generator, i.e., the decay rate of a transitional AC current generated at the primary side of the power generator, becomes slower than the decay rate of the transitional DC current flowing through the primary side of the power generator. In this case, the current becomes zero in a breaker 11, and the breaker 11 can be opened. However, if the resistance of the second short-circuit device is large, and resistance R2 becomes greater than R1, the aforementioned relation of decay rates will be inversed. In this case, the current of the primary side does not become zero, and the breaker 11 cannot block the current.

Under the above circumstances, it is desirable to provide an over-voltage prevention device, which is capable of recovering from a failure in the electric power system within a short time and ensuring continuous operation with a simple structure.

DETAILED DESCRIPTION

In general, according to one embodiment, an over-voltage prevention device is provided between a secondary-winding side of a wound-rotor induction machine and a frequency converter configured to excite the secondary-winding side of the wound-rotor induction machine through a three-phase excitation power supply line. The over-voltage prevention device includes a first short-circuit device having a function of short-circuiting between phases of the excitation power supply line, and a second short-circuit device having a function of short-circuiting between phases of the excitation power supply line with a short-circuit impedance greater than a short-circuit impedance of the first short-circuit device.

Hereinafter, embodiments will be described with reference to FIG. 1 to FIG. 3.

Figure 1:
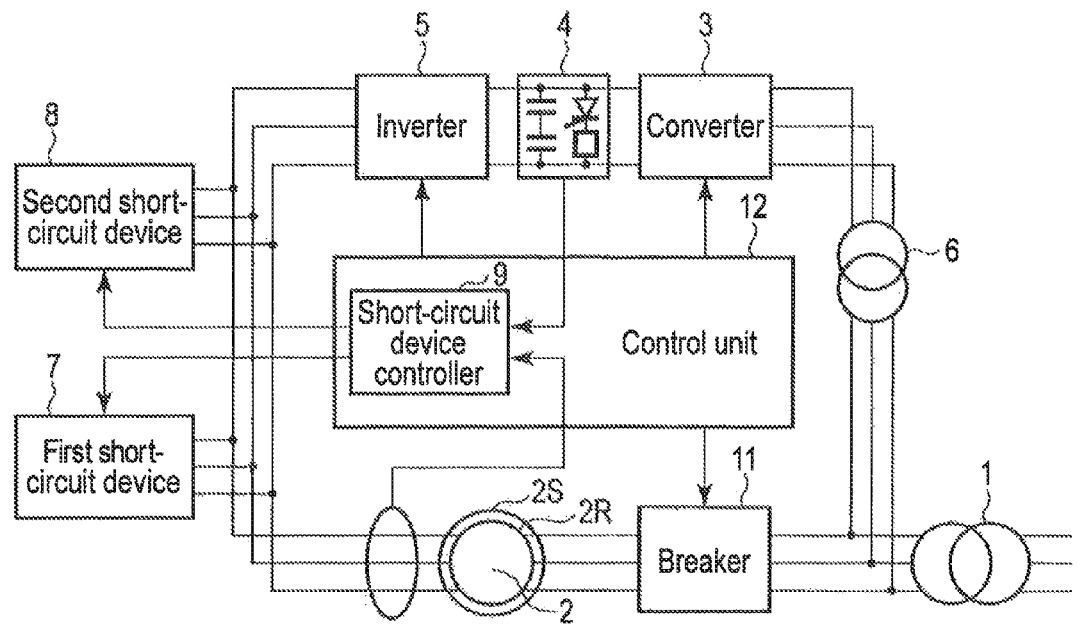
FIG. 1 illustrates an example of a configuration of a variable speed electric system including a secondary over-voltage prevention device of a wound-rotor inductive power generator according to an embodiment.
Figure 4:
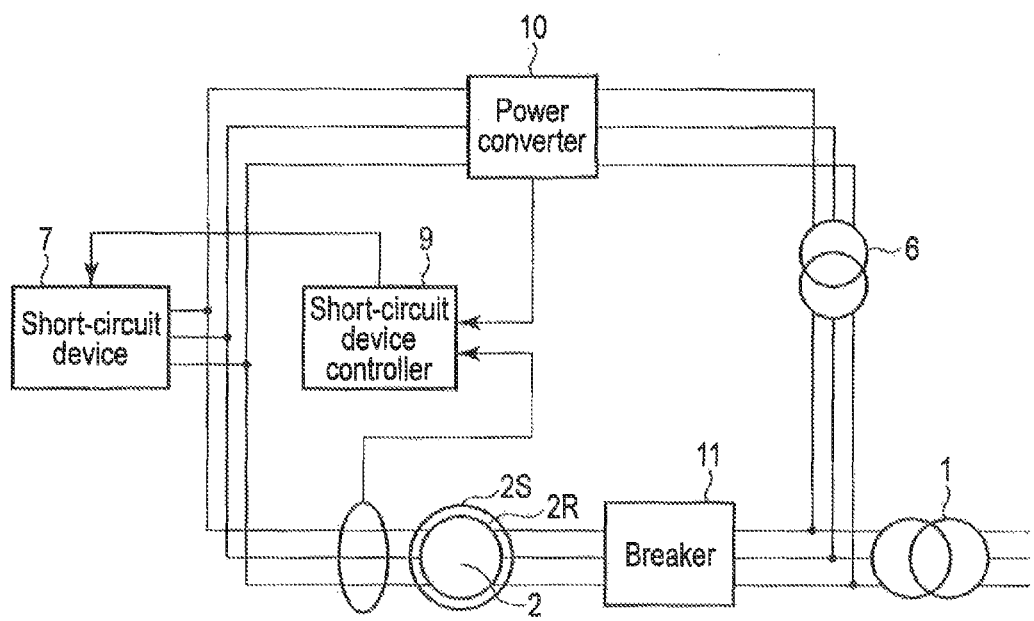
FIG. 4 illustrates an example of a configuration of the variable speed electric system in which only the first short-circuit device is provided.
Figure 5:
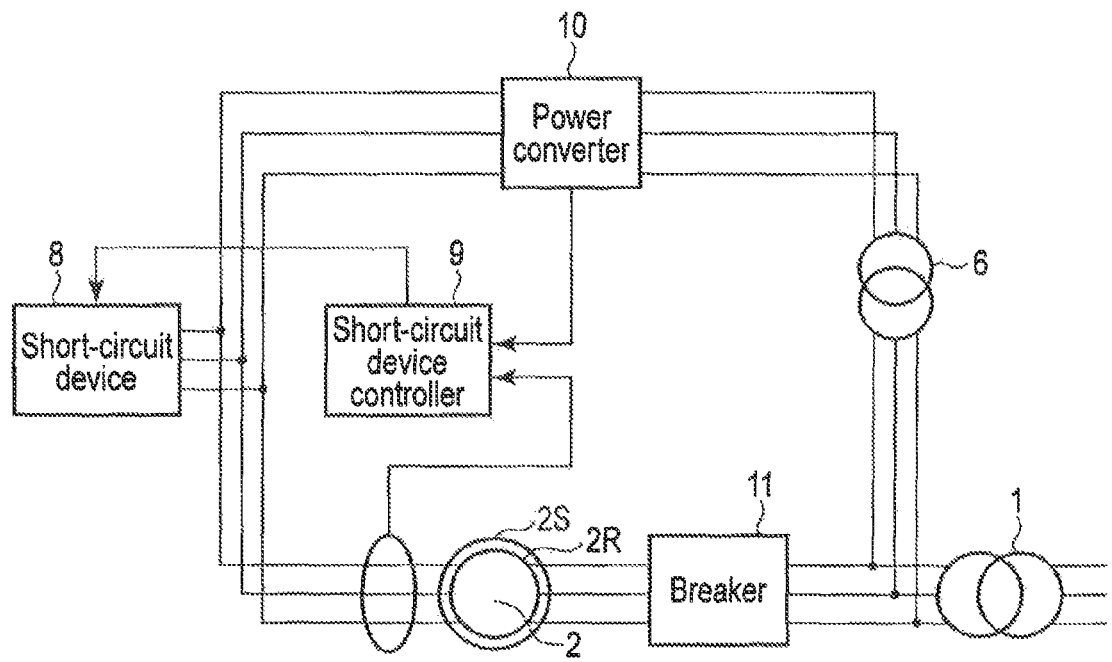
FIG. 5 illustrates an example of a configuration of the variable speed electric system in which only the second short-circuit device is provided.

FIG. 1 illustrates an example of a configuration of a variable speed electric system including a secondary over-voltage prevention device of a wound-rotor inductive power generator according to an embodiment of the present invention. In FIG. 1, the same reference numerals as in FIGS. 4 and 5 denote the same elements.

As shown in FIG. 1, the variable speed electric system comprises a main transformer 1, wound-rotor inductive power generator (variable speed electric device) 2, a converter (frequency converter) 3, a chopper circuit 4, an inverter 5, a transformer 6, a first short-circuit device 7, a second short-circuit device 8, a short-circuit device controller 9, a breaker 11, and a control unit 12. The chopper circuit 4 comprises a capacitor and an over-voltage suppression chopper (DC chopper unit). The converter 3, chopper circuit 4 and inverter 5 form a variable frequency power supply. The first short-circuit device 7, second short-circuit device 8, and short-circuit device controller 9 forms the secondary over-voltage prevention device.

The wound-rotor inductive power generator 2 is connected to a motor such as a waterwheel, pump-turbine, or pinwheel not shown in the drawings on the rotation axis.

The main transformer 1 performs voltage conversion between the variable speed electric system and the electric power system.

The wound-rotor inductive power generator 2 is connected to the electric power system through the main transformer 1.

The converter 3 supplies rectified voltage to the DC chopper unit of the chopper circuit 4.

The chopper circuit 4 supplies a DC voltage to the inverter 5.

The inverter 5 converts an output of the wound-rotor inductive power generator 2 and supplies an excitation power to a secondary winding of the wound-rotor inductive power generator 2.

The transformer 6 transforms the output of the wound-rotor inductive power generator 2 so as to conform to the rated value of the converter 3.

Figure 6:
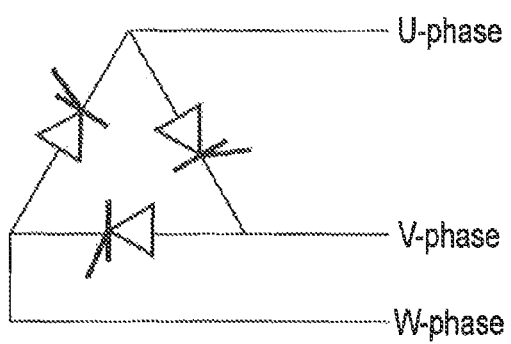
FIG. 6 illustrates a circuit structure of the first short-circuit device.

The first short-circuit device 7 is connected to each excitation power supply line connected to the secondary winding of the wound-rotor inductive power generator 2. During a fault in the electric power system, when a current flowing through the excitation power supply line is greater than a set value, and a voltage of the DC chopper unit of the chopper circuit 4 is greater than a set value, the first short-circuit device 7 is controlled by the short-circuit device controller 9 to perform a short-circuit operation. The short-circuit operation is canceled by the variable frequency power supply after the fault in the electric power system is resolved. As a result of the operation of the first short-circuit device 7, the current flowing through the breaker 11 becomes zero, thereby ensuring blocking a fault current by the breaker 11. The first short-circuit device 7 is formed using a separately-excited element such as a thyristor as shown in FIG. 6.

Figure 7:
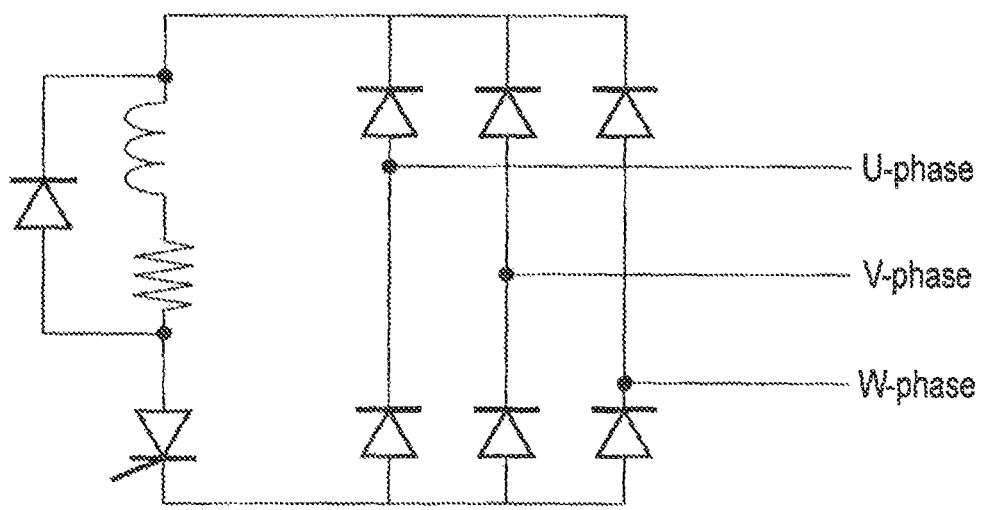
FIG. 7 illustrates a circuit structure of the second short-circuit device.

The second short-circuit device 8 is connected to each excitation power supply line connected to the secondary winding of the wound-rotor inductive power generator 2. The second short-circuit device 8 performs a short-circuit operation under the same condition as for the first short-circuit device 7, and is inactivated after the first short-circuit device 7 is inactivated. As a result of the operation of the second short-circuit device 8, an over-current or over-voltage is prevented from occurring in the variable frequency power supply even when the first short-circuit device 7 is inactivated. The second short-circuit device 8 is formed by a self-excited element, a resistance, an inductance, a plurality of rectifiers, and a rectifier dedicated for commutation, as shown in FIG. 7.

The short-circuit device controller 9 obtains a measured value of a current in the excitation power supply line and a measured value of voltage of the DC chopper unit of the chopper circuit 4 to detect a fault current based on the measured values, or to control executing or canceling short-circuit operations of the short-circuit devices 7 and 8. For instance, in a fault in the electric power system, when a current flowing through the excitation power supply line is greater than a set value, and the voltage of the DC chopper unit of the chopper circuit 4 is greater than a set value, the short-circuit device controller 9 controls the short-circuit devices 7 and 8 to perform short-circuit operation and stops the operations of the inverter 5 and the converter 3 at the same time, stops the operation of the first short-circuit device 7 at the time when the current flowing through the first short-circuit device 7 decays to zero, and then stops the operation of the second short-circuit device 8 after a short-circuit current is shunted to the second short-circuit device 8 for a predetermined period of time.

The breaker 11 is used to block the primary power supply line of the wound-rotor inductive power generator 2 under the control of the control unit 12.

The control unit 12 controls the entire system of the embodiment.

Next, the operation of the secondary over-voltage prevention device at the time of a fault in the electric power system is explained with reference to the timing charts of FIGS. 2 and 3.

For instance, if a voltage affected to a stator 2S of the wound-rotor inductive power generator 2 greatly changes due to a three-phase ground fault occurring in the electric power system, an over-voltage is induced to a rotor 2R. The short-circuit device controller 9 detects the over-voltage through the secondary circuit at the time T1. Upon the detection of the over-voltage, the short-circuit device controller 9 activates the first short-circuit device 7 and the second short-circuit device 8 and steps the operations of the converter 3 and the inverter 5 at the same time.

Figure 2:
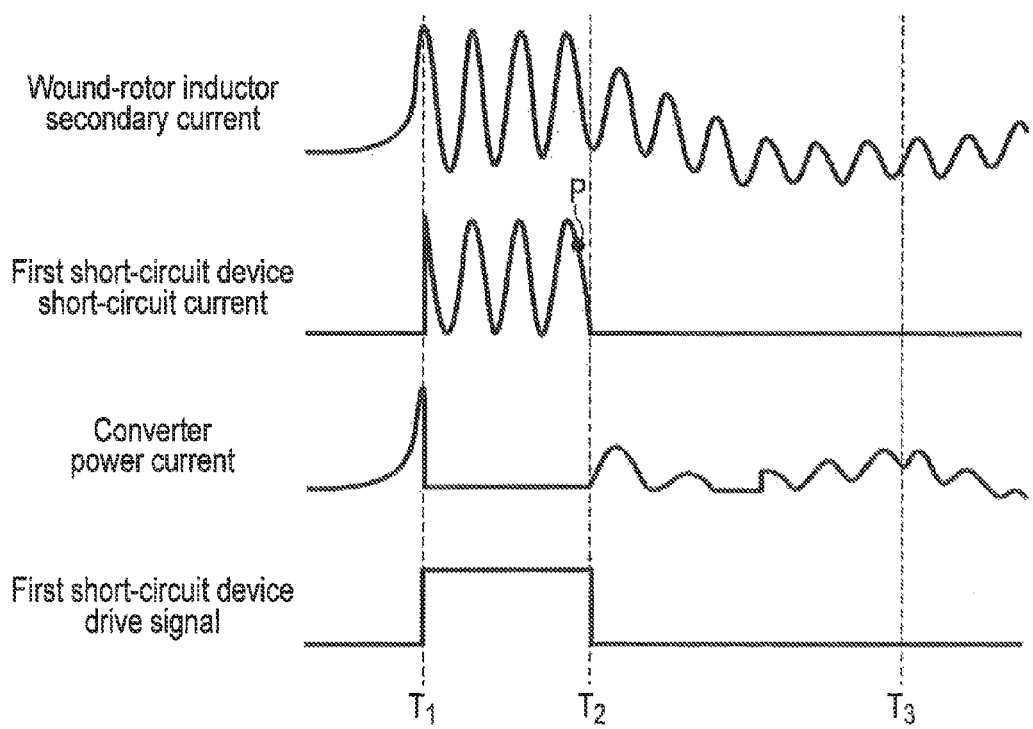
FIG. 2 is a timing chart that shows a driving signal of a first short-circuit device or the like according to the embodiment.
Figure 3:
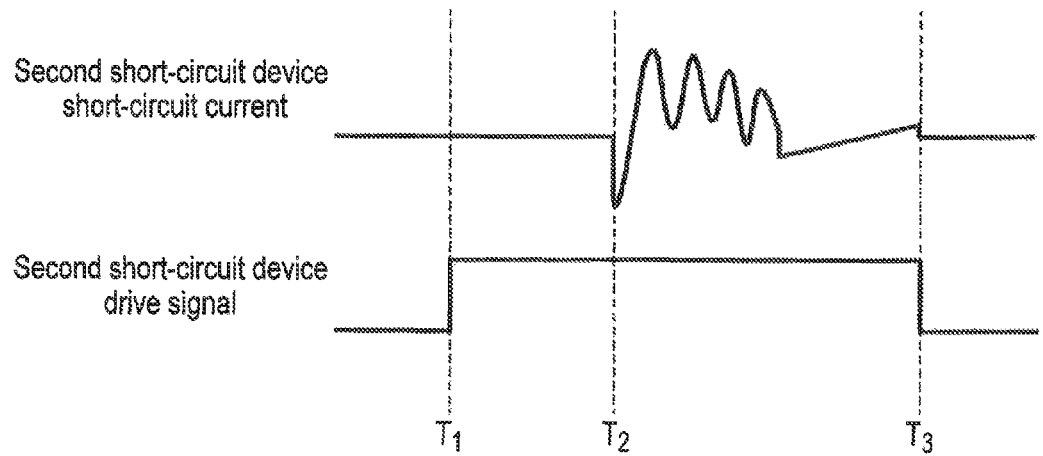
FIG. 3 is a timing chart that shows to driving signal of a second short-circuit device or the like according to the embodiment.

When the fault is eliminated, and the over-voltage is decayed, a current flowing through the first short-circuit device 7 will gradually decay, as shown in FIG. 2. In this example, the short-circuit device controller 9 controls the inverter 5 to apply an inverse voltage to the first short-circuit device 7 at the time when a current flowing through the first short-circuit device 7 drops below a current value P (for example, a value smaller than 1.3 times the rated value of the inverter 5) which is a condition for resetting the first short-circuit device 7, and immediately after the application of the inverse current, sets the current flowing through the first short-circuit device 7 to be zero. Then, the short-circuit device controller 9 turns off the first short-circuit device 7 at the time T2 after a lapse of a predetermined time.

In this case, the current flowing through the first short-circuit device 7 may flow into the inverter 5. However, since the second short-circuit device 8 is activated at that time, as shown in FIG. 3, the inverter 5 applies a reverse-phased voltage to the first short-circuit device 7 to inactivate the first short-circuit device 7 to reduce the amount of current to be commuted to the inverter 5. Accordingly, the inverter 5 restarts operation at the time T3 without the current flowing into the inverter 5 being an over-current again.

According to the embodiment, since the first short-circuit device 7 and the second short-circuit device 8 can sustain an over-voltage and over-current occurring at the time of a fault in the electric power system, the rated capacity of the converter 3 or the inverter 5 is determined based on the voltage set by the slip frequency during normal operation and the current during the rated operation, thereby eliminating the necessity for providing a large amount of capacity. In addition, the first short-circuit device 7 and the second short-circuit device 8 can be designed with a short-time rating, thereby miniaturizing the devices.

In the embodiment, since the transitional DC current flowing through the first short-circuit device 7 is a transitional current flowing through the secondary-winding side, the current flowing through the primary side is an AC current. Accordingly, the resistance between the rotor R2 of the wound-rotor inductive power generator 2 and the short-circuit device is greater than the resistance between the point of failure and the stator 23 of the wound-rotor inductive power generator 2, and the rate of decay of a transitional DC current at the primary side is slower than that of transitional DC at the secondary-winding side. As a result, the current flowing through the breaker 11 at the primary side is prevented from not reaching zero.

Furthermore, with the aforementioned variable speed electric system merely comprising a converter with a rated capacity determined based on the normal operation, the first short-circuit device 7 is not re-activated after being stopped by the operation of the second short-circuit device 8, thereby ensuring continuous operation of the variable speed electric system.

As stated above, according to the aforementioned embodiments, it is possible to provide an over-voltage prevention device, which is capable of recovering from a fault in the electric power system within a short time and ensuring continuous operation with a simple structure.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An over-voltage prevention device provided between a secondary-winding side of a wound-rotor induction machine and a frequency converter configured to excite the secondary-winding side of the wound-rotor induction machine through a three-phase excitation power supply line, the over-voltage prevention device comprising:
   a first short-circuit device having a function of short-circuiting between phases of the excitation power supply line;
   a second short-circuit device having a function of short-circuiting between phases of the excitation power supply line with a short-circuit impedance greater than a short-circuit impedance of the first short-circuit device; and
   a control unit configured to i) activate the first short-circuit device and the second short-circuit device at a time of a fault in an electric power system, ii) inactivate the first short-circuit device after the fault is eliminated, and iii) inactivate the second short-circuit device after a lapse of a predetermined time from a time when the first short-circuit device is inactivated.

2. The over-voltage prevention device according to claim 1, wherein:
   the first short-circuit device comprises a separately-excited element; and
   the second short-circuit device comprises a self-excited element, a resistance, and an inductance.

* * * * *